United States Patent Office 2,765,341
Patented Oct. 2, 1956

2,765,341

TRIAMINODIPHENYL ETHERS AND SULFIDES

Walter V. Wirth, Woodstown, N. J., and Stanley Earl Krahler, Wilmington, Del., assignors to E. I. du Pont de Nemours and Company, Wilmington, Del., a corporation of Delaware No Drawing. Application August 26, 1955, Serial No. 530,882

3 Claims. (Cl. 260—571)

This invention is directed to new compositions of matter useful as cross-linking agents for resins, plastics and elastomers, and as intermediates for the preparation of organic triisocyanates. In the preparation of resins, plastics and elastomers, polyfunctional chain-extending or network-extending agents are generally employed to create structures of high molecular weight. When three-dimensional strength and resistance to deformation is desired in the final product, trifunctional cross-linking or curing agents are required. Organic triamino compounds are useful for this purpose because of the high reactivity of the amino group and the stability of the linkages it forms. The triisocyanates which may be obtained directly from said organic triamino compounds by phosgenation have great utility. Accordingly, polyethers, polyamides, polyurethanes and epoxide resins which contain functional carboxyl, isocyanato, or epoxide groups free to react with the —NH₂ groups of the triamines, or which contain functional —OH, —SH or —NH groups for reaction with the —NCO groups of the triisocyanates, are converted into superpolymeric structures by these trifunctional cross-linking and curing agents.

An object of this invention is to provide new and useful triamines which may be prepared in good yields from low cost materials. Another object of this invention is to provide triamines which are suitable for conversion into triisocyanates by existing commercial methods. It is a further object of this invention to produce novel triaminodiphenyl ethers and sulfides which are useful extending agents for resins, plastics and elastomers containing free functional groups capable of reacting with amino groups. The novel compounds of this invention further serve as intermediates for the preparation of triisocyanates which are useful in the curing of certain polymeric materials such as polyurethanes and polyamides and in the formation of adhesives.

The triamino compounds of the present invention are represented by the formula

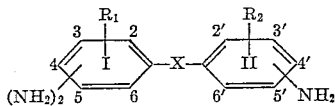

in which X is oxygen or sulfur, and $R_1$ and $R_2$ are hydrogen, lower alkyl, or lower-alkoxyl, the two amino groups on ring I being positioned other than ortho to one another, and at least one of the 2,6, 2′ and 6′ positions being unsubstituted.

The above triamino compounds are the triaminodiphenyl ethers and thioethers and their ring-alkylated and alkoxylated derivatives. The amino group of ring II may be on any of the designated positions; the two amino groups of ring I may occupy only the 2,4, 2,5, 2,6 and 3,5-positions. The preferred arrangements for the amino groups are 2,2′,4 and 2,4,4′, preferably where $R_1=R_2=$ hydrogen. A preferred example would be where $X=$ oxygen, namely 2,2′,4-triaminodiphenyl ether and 2,4,4′-triaminodiphenyl ether.

As indicated in the structural representation of the triamines, phenyl rings I and II may also carry a loweralkyl or lower-alkoxyl radical. By lower-alkyl is meant a $C_1$—$C_4$ alkyl radical, i. e., methyl, ethyl, propyl, and butyl, preferably methyl. Similarly, lower-alkoxyl radical means methoxy, ethoxy, propoxy and butoxy, preferably methoxy. The molecule may contain one of these radicals, on either ring, or two of these radicals, one on each ring, and when there are two such groups they may be the same or different alkyl and/or alkoxyl groups. Any of the nuclear positions not already bearing an amino group may be occupied by one of these groups as long as there remains at least one unsubstituted position ortho to the ether or sulfide link. This is desirable as the 2,2′,6,6′-tetrasubstituted diphenyl ethers and thioethers, on steric-grounds, are difficult to prepare and are very sluggish in the chemical reactions designed to exploit their utility.

Desirable diphenyl ethers and diphenyl thioethers are those substituted as follows: 2,3′,4-triamino-4′-methyl-; 2,3′,4 - triamino - 4′ - methoxy-; 2,4,4′ - triamino - 3′ - methoxy-; 2,4,4′ - triamino - 5 - methyl-; 2,2′,4 - tri - amino - 5 - methoxy-; 2,4,4′ - triamino - 6 - methoxy-; 2,3′,4 - triamino - 4′,5 - dimethyl-; 2,4,4′ - triamino - 3′-methoxy-5-methyl-.

It will be noted that in the above compounds the two amino groups of ring I are in the 2,4-positions. This is the desired arrangement as these triamines are readily synthesized from accessible intermediates. The 2,5, 2,6 and 3,5-diamino arrangements in ring I are also within the scope of the invention, as for example in the 2,4′,5-triamino - 2′,4 - dimethyl-, 2′,3,5 - triamino - 4′ - methyl, and 2,3′,6-triamino-4′-methoxy diphenyl ethers and thioethers.

The above-defined triamines are prepared by reduction of the corresponding trinitro-, or dinitro-monoamino-, or diamino-mononitro diphenyl ethers and sulfides; the particular method, e. g., (a) catalytic hydrogenation, (b) reduction with iron, or (c) reduction with stannous chloride, being suited to the compound.

The nitro bodies themselves are conveniently prepared in good yields by the general reaction of a salt, usually the sodium or potassium salt, of an appropriately substituted phenol or thiophenol with a halonitro- or halodinitrobenzene having at least one nitro group ortho or para to the halo group. The following reaction schemes illustrate the general method. It will be understood that the phenols and thiophenols are in the form of their sodium or potassium salts. It will also be understood that alkyl or alkoxyl groups as defined above may also be present in the reactants. The preparation of said nitro bodies may be carried out as follows:

1. Reaction of a nitrophenol (or thiol) with a 2,4, or 2,5, or 2,6-dinitrochlorobenzene (as described in Beilsteins Handbuch der organischen chemie (4th ed.) VI, pp. 255, 343); 2,2′,4- and 2,4,4′-trinitrodiphenyl ether and the corresponding diphenyl sulfides are obtained in this way. As indicated, the reactants may also contain alkyl or alkoxyl groups. Thus, on condensing potassium 2-nitro-4-methylphenoxide with 2,4-dinitrochlorobenzene, 2,2′,4-trinitro-4′-methyldiphenyl ether is obtained (J. Org. Chem. 19 1421 (1954)). Similarly, the combination of 3-nitro-4-methoxyphenol and 2,4-dinitro-5-methylchlorobenzene yields 2,3′,4-trinitro-4′-methoxy-5-methyldiphenyl ether. The most desirable results are obtained with 2,4-dinitrochlorobenzenes and the o-, m-, and p-nitrophenols and thiols. When the chloro group is activated by only one ortho or para nitro group, as in 2,5-dinitrochlorobenzene and its alkyl and alkoxyl substituted derivatives, phenols containing a meta nitro group react smoothly, whereas inferior results are obtained with the ortho and para nitrophenols. When the 2,2′,5- and 2,4',5 arrangements of nitrogen atoms in the final triamino compounds are desired, it is best to employ the corresponding amino (or acetylamino) phenols according to method 2 which follows.

2. Reaction of an o-, m-, or p-aminophenol (or thiol) or its acetyl derivative, with a dinitrohalobenzene containing at least one nitro group ortho or para to the halogen (these may contain alkyl or alkoxyl substituents). If an acetylamino group is present, it may be hydrolyzed later to the free amino group. Thus, 2-amino-2',4'-dinitrodiphenyl sulfide is obtained in a yield of 93% by reaction of 2-aminothiophenol with 2,4-dinitrochlorobenzene in ethanol containing an equivalent of sodium hydroxide. Catalytic hydrogenation over nickel or chemical reduction with stannous chloride yields the desired triamine as given in Example 3.

3. Condensation of an ortho or para mononitrohalobenzene with a 3,5-dinitrophenol or thiophenol; this affords a route to structures having the 2', 3,5- and the 3,4',5-triamino arrangement. Similarly, instead of the 3,5-dinitrophenol, any diacetylaminophenol or thiophenol may be employed, e. g., reaction of sodium 2,4-diacetylaminothiophenoxide with 3-methoxy-4-nitrochlorobenzene, followed by hydrolysis of the acetylamino groups, to yield the nitrodiaminodiphenyl sulfide.

4. Reaction of a phenol, e. g., o-cresol, with a dinitrohalobenzene in which at least one nitro group is ortho or para to halogen, e. g., 2,6-dinitrochlorobenzene, to form the dinitrophenyl tolyl ether, followed by mononitration. The third nitro group enters the phenyl ring not already substituted by nitro groups, the points of entry depending on the orienting power of its substituents. Separation of the isomeric trinitro compounds is accomplished by fractional crystallization. If desired, the mixture can be reduced directly to the triamines and used as such.

5. Alternatively, the dinitrodiphenyl ethers having a nitro group in each ring may also be mononitrated to mixtures of trinitro compounds. This method, however, is less preferable when a particular isomer is desired as it is not always possible to direct the orientation of the third nitro group.

In general, the preparation of the diphenyl ethers and sulfides containing nitro and amino groups as intermediates for the triamines for this invention is readily accomplished. The nitro (or amino) phenols and thiophenols including alkyl or alkoxyl homologs and analogs, are either known or may be prepared by unambiguous clean-cut methods. Many mono- and dinitro-substituted halobenzenes, including those containing alkyl or alkoxy groups, have been adequately described in the chemical literature.

The triaminodiphenyl ethers and sulfides of the present invention have the significant advantage of being easily and safely prepared in good yields from readily available and inexpensive intermediates and no unusual equipment for their preparation or reduction is required.

The following examples illustrate the preparation of the triaminodiphenyl ethers and sulfides of the present invention; all quantities are in parts by weight:

*Example 1*

A mixture of 122 parts of 2,4,4'-trinitrodiphenyl ether, 362 parts of isopropyl alcohol and 1.5 parts of palladium catalyst (3% palladium by weight on carbon) are hydrogenated in an autoclave, under agitation and a hydrogen pressure of 500 p. s. i. g. at 83–90° C., until absorption of hydrogen slows. The hydrogenation is completed by heating the charge for one-half hour at 100° C. and 500 p. s. i. g. hydrogen. The autoclave is cooled and discharged. The crude material is heated to reflux in the presence of 1 part of sodium hydrosulfite and 1 part of sodium carbonate (these materials are added to stabilize the triamine against air oxidation) and filtered hot to remove the catalyst. On cooling the filtrate to 10° C., 2,4,4'-triaminodiphenyl ether separates as tan crystals, melting range 111–112° C. The yield of triamine is 73% of theory.

*Example 2*

Following the conditions and procedure given in Example 1, hydrogenation of a mixture of 122 parts of 2,2',4-trinitrodiphenyl ether, 362 parts of isopropyl alcohol and 3.0 parts of 3% Pd on carbon catalyst yields 2,2',4-triaminodiphenyl ether in 70% yield as brown crystals melting at 111.5–112.5° C.

*Example 3*

A slurry of 116.4 parts of o-(2,4-dinitrophenylmercapto) aniline, 377 parts of isopropyl alcohol, 10 parts of calcium carbonate and 10 parts of nickel catalyst (approximately 25% nickel on filter cel) is hydrogenated under agitation at 87–107° C. and 500 p. s. i. g. hydrogen pressure until absorption of hydrogen ceases. The charge is cooled, removed from the autoclave, heated to reflux in the presence of 1 part of decolorizing carbon, and filtered hot to remove the catalyst. On cooling the filtrate to 10° C., 2,2',4-triaminodiphenyl sulfide is isolated, in a yield of 68%, as gray-brown crystals melting at 121.5–123° C.

*Example 4*

A mixture of 127.6 parts of 4'-methyl-2,3',4-trinitrodiphenyl ether, 362 parts of isopropyl alcohol and 1.5 parts of 3% Pd on carbon catalyst is hydrogenated and handled under the conditions described in Example 1. The filtrate obtained on removing the catalyst is concentrated to approximately 100 parts and chilled to 10° C. to give tan crystals of 2,3',4-triamino-4'-methyldiphenyl ether. The melting range of this triamine is 111–112.5° C. and the yield is 78% of theory.

*Example 5*

(a) A mixture of 423 parts of degreased 40-mesh iron filings, 12.3 parts of ferrous chloride tetrahydrate and 900 parts of water is heated to 100° C. with vigorous agitation. Formation of a black spot when a drop of the mixture on filter paper is cross-spotted with 2% sodium sulfide solution indicates presence of the reductant (ferrous ion). 150 parts of 4'-methoxy-2,3',4-trinitrodiphenyl ether is dissolved in 775 parts of dioxane at 60° C. and this solution is added dropwise over 2 hours to the refluxing iron filing-water mixture. Presence of reductant in the iron mixture is verified periodically by the sodium sulfide test described above. The mixture is agitated for about 10 minutes after all the nitrobody has been added and is made just alkaline to Brilliant Yellow by addition of 7 parts sodium carbonate. Then, to stabilize the triamine against air oxidation, 9 parts of sodium bisulfite are added and the hot solution is filtered to remove iron and iron oxide sludge. The sludge is washed on the filter with boiling water (two portions of 150 parts each), the washings being combined with the filtrate. The filtrate is distilled under nitrogen at atmospheric pressure to remove water and dioxane. The residual product is vacuum-distilled, 2,3',4-triamino-4'-methoxydiphenyl ether being obtained as an ambler oil boiling at 218° C. at 0.1 mm. Hg; the yield is 84.5% of theory.

On cooling, the triamine solidfies to a glass. It is characterized by conversion to its triacetyl derivative, a colorless solid, melting range 204–206° C., which is obtained in 91% yield on heating at the boil for 3 minutes a mixture of 20 parts triamine, 55 parts acetic anhydride and 105 parts dioxane and then drowning the mass in 750 parts of water.

(b) 2,3',4-triamino-4'-methoxydiphenyl ether is also obtained by catalytically hydrogenating the above trinitro compound at 70–80° C. and 500 p. s. i. g. hydrogen pressure, essentially as given in Examples 1 to 4 for other trinitro bodies. It is isolated by reduced pressure distillation in a yield of 79% of theory, a viscous oil solidifying to a glass, boiling point 220° C. at 0.1 mm. Hg pressure. Its triacetyl derivative is identified (by melting point and mixed melting point) as 2,3',4-triacetylamino-4'-methoxydiphenyl ether described above.

*Example 6*

(a) Following the iron-reduction procedure of Example 5, a solution (made up at 35° C.) consisting of 130 parts of p-(2,4-dinitrophenylmercapto) aniline and 520 parts of dioxane is added over a period of 2 hours to a stirred, refluxing mixture of 282 parts of iron filings, 8.2 parts of ferrous chloride tetrahydrate and 600 parts of water. Ten minutes after completion of the nitrobody addition the charge is made alkaline to Brilliant Yellow with 5 parts of sodium carbonate. 6 parts of sodium bisulfite are added and the mixture is filtered at 90° C. The iron sludge is washed with two portions 100 parts each. The combined filtrate and washings are distilled to remove water and dioxane and the residual material is distilled at low pressure. 2,4,4'-triaminodiphenyl sulfide is isolated as a greenish-yellow oil, boiling from 220° C. at 0.1 mm. to 225° C. at 0.19 mm. On cooling, the triamine solidifies to a hard tacky glass. The yield is 68% of theory.

The triamine is characterized as its triacetyl derivative, melting range 244.5–246° C. (recrystallized from alcohol), on acetylation with boiling acetic acid-acetic anhydride.

(b) 2,4,4'-triaminodiphenyl sulfide is also obtained by reduction of 2,4,4'-trinitrodiphenyl sulfide (21.4 parts) with stannous chloride dihydrate (158 parts) in 37% hydrochloric acid (157 parts) at 85–114° C. Its triacetyl derivative is identical (by melting point and mixture melting point) to that described above.

We claim:

1. The compound

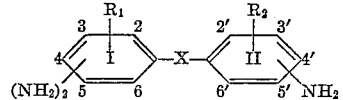

wherein X is taken from the group consisting of oxygen and sulfur, $R_1$ and $R_2$ are taken from the group consisting of hydrogen, lower-alkyl and lower-alkoxyl, the two amino groups on ring I being positioned other than ortho to one another and at least one of the 2,6,2' and 6' positions being unsubstituted.

2. The compound 2,2',4-triaminodiphenyl ether.
3. The compound 2,4,4'-triaminodiphenyl ether.

No references cited